(12) United States Patent
Lee et al.

(10) Patent No.: US 7,597,550 B2
(45) Date of Patent: Oct. 6, 2009

(54) MOLDING APPARATUS HAVING EJECTOR SLEEVE AND EJECTOR PIN

(75) Inventors: Sang-hun Lee, Seoul (KR); Jong-won Lee, Seoul (KR); Sang-bae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 11/475,182

(22) Filed: Jun. 27, 2006

(65) Prior Publication Data

US 2007/0003659 A1     Jan. 4, 2007

(30) Foreign Application Priority Data

Jun. 30, 2005     (KR) ...................... 10-2005-0057754

(51) Int. Cl.
   *B29C 45/40*     (2006.01)

(52) U.S. Cl. .................... 425/556; 425/444; 425/577

(58) Field of Classification Search ............... 425/441, 425/444, 436 RM, 556, 577, DIG. 58; 264/334
   See application file for complete search history.

(56) References Cited

U.S. PATENT DOCUMENTS

| | | | | |
|---|---|---|---|---|
| 3,893,644 A | * | 7/1975 | Drazick | 249/68 |
| 4,050,666 A | * | 9/1977 | Van Tichelt | 249/68 |
| 4,372,741 A | * | 2/1983 | Cane et al. | 425/556 |
| 4,576,775 A | * | 3/1986 | Kaeufer et al. | 264/323 |
| 4,741,874 A | * | 5/1988 | Harrison | 264/161 |
| 5,074,771 A | * | 12/1991 | Thakrar et al. | 425/130 |
| 5,227,178 A | * | 7/1993 | Rieker | 425/556 |
| 5,353,165 A | * | 10/1994 | VanDeMoere et al. | 359/819 |
| 5,460,509 A | * | 10/1995 | Sawafuji et al. | 425/556 |
| 5,472,334 A | * | 12/1995 | Takahashi | 425/554 |
| 5,511,967 A | * | 4/1996 | Berdan | 425/533 |
| 5,545,365 A | * | 8/1996 | Asai | 264/328.7 |

(Continued)

FOREIGN PATENT DOCUMENTS

EP     0 083 788     7/1983

(Continued)

OTHER PUBLICATIONS

KR Office Action dated Sep. 22, 2006 issued in KR 2005-57754.

*Primary Examiner*—Yogendra Gupta
*Assistant Examiner*—Emmanuel S Luk
(74) *Attorney, Agent, or Firm*—Stanzione & Kim LLP

(57) ABSTRACT

An molding apparatus includes a core having a recessed part corresponding to a protruding part of a molded article, an ejector pin movably provided in the core to eject the molded article, an ejector sleeve movably provided in the core to push the protruding part of the molded article, and an ejector actuating part to move the ejector pin and the ejector sleeve together to a separation position where the protruding part of the molded article is separated from the recessed portion of the core, to bring the ejector sleeve into a stop position so that the ejector sleeve does not protrude from the core, and to move the ejector pin from the separation position to a removal position where the molded article is spaced apart from the core by a predetermined distance. Accordingly, the molding apparatus is capable of preventing damage caused on an ejector sleeve.

15 Claims, 8 Drawing Sheets

U.S. PATENT DOCUMENTS

| | | | |
|---|---|---|---|
| 5,551,858 A * | 9/1996 | Yoshizawa et al. | 425/217 |
| 6,872,069 B2 * | 3/2005 | Starkey | 425/556 |
| 2003/0012844 A1 * | 1/2003 | Starkey | 425/556 |
| 2007/0134366 A1 * | 6/2007 | Wang et al. | 425/556 |

FOREIGN PATENT DOCUMENTS

| | | |
|---|---|---|
| JP | 5-200806 | 8/1993 |
| JP | 09-141698 | 6/1997 |
| KR | 89-6573 | 5/1989 |

* cited by examiner

MOLDING APPARATUS HAVING EJECTOR SLEEVE AND EJECTOR PIN

CROSS-REFERENCE TO RELATED APPLICATIONS

This application claims priority under 35 U.S.C. § 119 from Korean Patent Application No. 2005-57754, filed on Jun. 30, 2005, in the Korean Intellectual Property Office, the disclosure of which is incorporated herein in its entirety by reference.

BACKGROUND OF THE INVENTION

1. Field of the Invention

The present general inventive concept relates to a molding apparatus and method of ejecting a molded article, and more particularly, to a molding apparatus and method which has an improved structure and mechanism to eject a molded article.

2. Description of the Related Art

In general, an injection molding apparatus includes a fixed mold to which an injection nozzle is attached, a movable mold which forms a cavity corresponding to an article with the fixed mold and which is installed so as to be moved relative to the fixed mold, and an ejector provided at the movable mold for ejecting the molded article from a core of the movable mold.

Hereinafter, the description of the ejector of the molding apparatus that separates the molded article from the core of the movable mold will be provided.

As disclosed in Japanese Laid-Open Publication No. H5-200806, a conventional molding apparatus includes an ejector pin movably provided for ejecting the molded article and an ejector sleeve movably provided for pushing a protruding part sticking out from a flat part of the molded article.

The ejector pin and the ejector sleeve of the conventional molding apparatus are moved to protrude to an outside of a shape surface of the core such that the molded article is completely separated from the shape surface of the core.

The conventional ejector sleeve is formed to be thinner than the ejector pin, even though its thickness is varied according to a shape of the protruding part of the molded article. And the ejector sleeve pushes the protruding part of the article toward the outside of the shape surface of the core to eject the protruding part of the molded article. Therefore, the protruding part sticking out from an inner surface of the molded article can be readily ejected from the shape surface of the core.

However, the conventional ejector sleeve of the molding apparatus protrudes to the outside of the shape surface of the core in order to push the protruding part of the article toward the outside of the shape surface of the core, so there is a possibility to damage an end portion of the ejector sleeve protruding from the shape surface of the core to be bent due to a pressing force exerted on the molded article. Further, damage can be caused to the molded article by a bent portion of the ejector sleeve, and to the shape surface of the core when the ejector sleeve is withdrawn inside the shape surface of the core while remaining bent.

SUMMARY OF THE INVENTION

The present general inventive concept provides a molding apparatus capable of preventing damage on an ejector sleeve.

Additional aspects and/or advantages of the present general inventive concept will be set forth in part in the description which follows and, in part, will be obvious from the description, or may be learned by practice of the present general inventive concept.

The foregoing and/or other aspects of the present general inventive concept may be achieved by providing a molding apparatus, comprising a core having a recessed part corresponding to a protruding part of a molded article, an ejector pin movably provided in the core to eject the molded article, an ejector sleeve movably provided in the core to push the protruding part of the molded article, and an ejector actuating part to move the ejector pin and the ejector sleeve together to a separation position where the protruding part of the molded article is separated from the recessed portion of the core, to bring the ejector sleeve into a stop position so that the ejector sleeve does not protrude from the core, and to move the ejector pin from the separation position to a removal position where the molded article is spaced apart from the core by a predetermined distance.

The ejector actuating part may comprise a first ejector plate to support the ejector pin to move together with the ejector pin, a second ejector plate which is disposed at a rear side of the first ejector plate with respect to an ejection direction to support the ejector sleeve to move together with the ejector sleeve, an ejector rod to move the first ejector plate to eject the article from the core, and a locking unit to combine the first ejector plate and the second ejector plate to allow the ejector rod to move the first ejector plate and the second ejector plate together to the separation position and to separate the first ejector plate from the second ejector plate to allow the ejector rod to move only the first ejector plate from the separation position to the removal position.

The locking unit may comprise a stop bar which passes through the first ejector plate vertically to move together with the second ejector plate and to stop a movement of the second ejector plate at the separation position, and a spring member combined with the stop bar to bias the first ejector plate toward the second ejector plate.

The stop bar may be provided with a spring mount plate to support the spring member so that the spring member biases the first ejector plate toward the second ejector plate.

The apparatus may further comprise a core plate to support the core, and the stop bar may be brought to the stop position when the stop bar contacts the core plate at the separation position.

The locking unit may comprise a stop bar which passes through the first ejector plate vertically to stop a movement of the second ejector plate at the separation position, a locking protrusion that protrudes from either one of the first ejector plate and the second ejector plate to the other thereof, and a protrusion accommodating part provided in the other one of the first ejector plate and the second ejector plate to be combined with the locking protrusion so that the first ejector plate moves together with the second ejector plate to the separation position.

The apparatus may further comprise a core plate to support the core, and the stop bar may protrude from the core plate to the first ejector plate.

The second ejector plate may be provided with an ejector rod through hole through which the ejector rod passes.

One end portion of the ejector sleeve may be disposed between the first ejector plate and the second ejector plate, and may be provided with a sleeve spring to bias the ejector sleeve towards the second ejector plate.

The foregoing and/or other aspects of the present general inventive concept may also be achieved by providing a molding apparatus, comprising a core having a first core part and a second core part, a first ejector to correspond to the first core part, second ejector to correspond to the second core part, and an ejector actuating part to move the first ejector and the second ejector between an original position and a separation position, and to move the second ejector between the separation position and a removal position by a second distance during controlling the first ejector to be remained in the separation position.

BRIEF DESCRIPTION OF THE DRAWINGS

These and/or other aspects of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
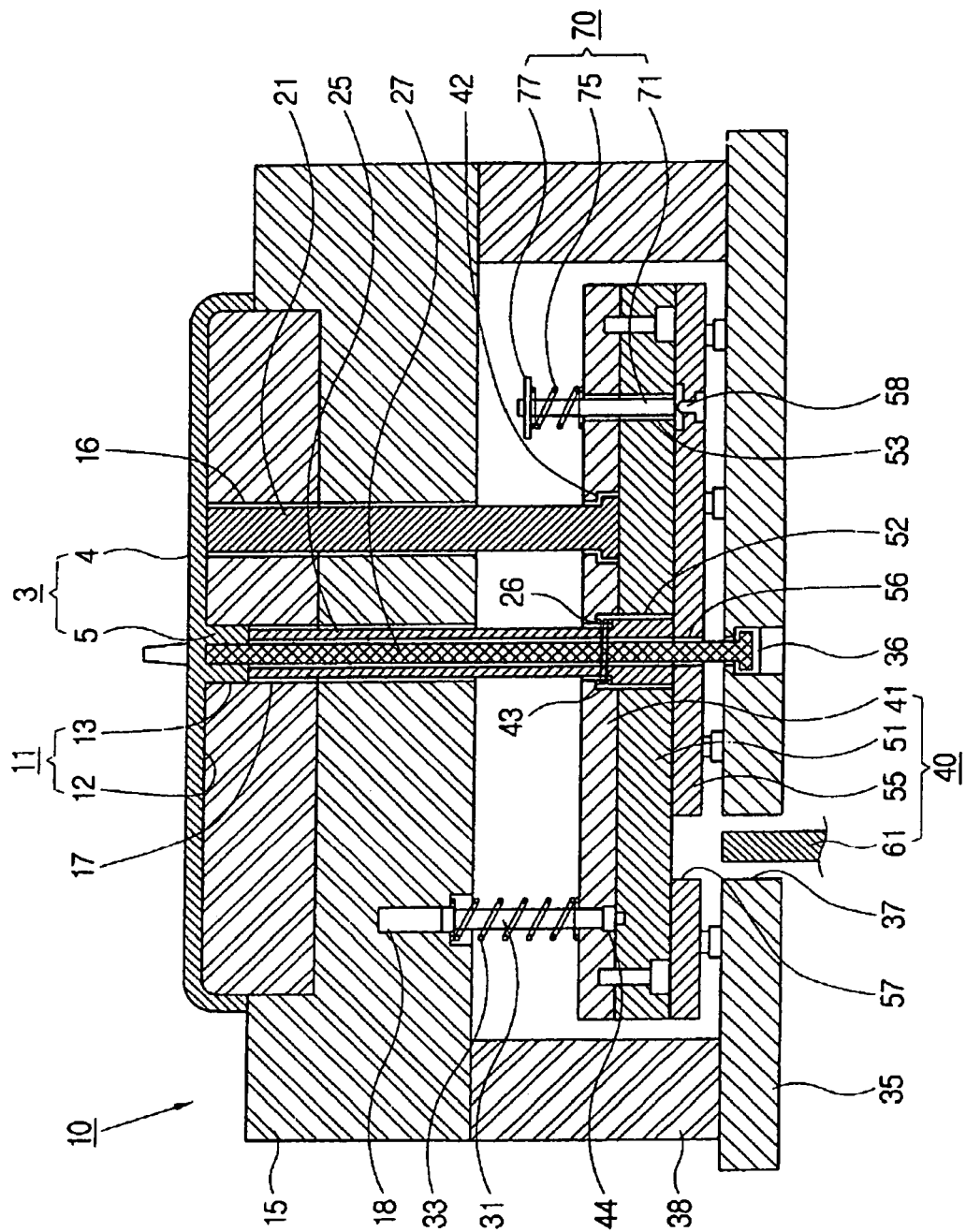
FIG. 1 is a schematic cross sectional view illustrating a molding apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As illustrated in FIGS. 1 to 4, a molding apparatus according to an embodiment of the present general inventive concept includes a fixed mold (not shown) on which an injection nozzle (not shown) is attached, and a movable mold 10 which is installed so as to be moved relative to the fixed mold (not shown).

The movable mold 10 includes a core 11 having a recessed part 13 corresponding to a protruding part 5 of a molded article 3, an ejector pin 21 movably provided in the core 11 to eject the molded article 3, an ejector sleeve 25 movably provided in the core 11 to push the protruding part 5 of the molded article 3, and an ejector actuating part 40 which moves the ejector pin 21 and the ejector sleeve 25 to eject the molded article 3.

The molded article 3 is molded by an injection nozzle (not shown) injecting molten resin into a cavity (not shown) between the fixed mold (not shown) and the core 11 of the movable mold 10. The molded article 3 has a flat part 4 forming a flat surface, and the aforementioned protruding part 5 sticking out from (expanded from) the flat part 4 to correspond to the recessed part 13 of the core 11. The protruding part 5 may be a boss having an opening at one side thereof as illustrated in FIGS. 1 to 4. The protruding part 5 may also have a form of a rod. More than one protruding part 5 can be provided, even though only one protruding part 5 is provided in the present embodiment.

The core 11 has a shape of a block with a shape surface 12 which is provided at an upper part of the core 11 and corresponds to a shape of the molded article 3. In the shape surface 12 of the core 11, the recessed part 13 is depressed to correspond to the protruding part 5 of the molded article 3. A lower surface of the core 11 is supported by a core plate 15. In the core 11 and the core plate 15, an ejector pin guiding hole 16 through which the ejector pin 21 passes to eject the molded article 3, and a ejector sleeve guiding hole 17 through which the ejector sleeve 25 passes are provided. In the core plate 15, a return pin accommodating hole 18 is provided to accommodate a return pin 31 described below.

The ejector pin 21 has a shape of a long rod with a lower end portion having a diameter larger than that of other portions thereof. The lower end portion of the ejector pin 21 is disposed between a pin supporting plate 41 and a first ejector plate 51 to move together with the pin supporting plate 41 and the first ejector plate 51, while an upper end portion of the other portions of the ejector pin 21 opposite to the lower end portion is movably received in the ejector pin guiding hole 16.

The ejector sleeve 25 has a shape of a long tube to movably receive a sleeve pin 27 described below, and a lower end portion of the ejector sleeve 25 has a diameter larger than that of other portions thereof. The lower end portion of the ejector sleeve 25 is disposed between the first ejector plate 51 and a second ejector plate 55 to move together with the second ejector plate 55, while an upper end portion of the other portions of the ejector sleeve 25 opposite to the lower end is movably received inside the ejector sleeve guiding hole 17. A sleeve spring 26 can be provided between the pin supporting plate 41 or the first ejector plate 51 and one side of the ejector sleeve 25 to press the ejector sleeve 25 toward the second ejector plate 55, so that the ejector sleeve 25 can be moved together with the second ejector plate 55.

The sleeve pin 27 has a shape of a long rod to be received in the ejector sleeve 25, and a lower end portion of the sleeve pin 27 has a diameter larger than that of other portions thereof. The lower end portion of the sleeve pin 27 is coupled with a base plate 35 as described below, while a rest portion thereof is received inside the ejector sleeve 25. An upper end portion of the other portions of the sleeve pin 27 opposite to the lower portion protrudes above an upper end of the ejector sleeve 25 so as to form a recessed portion corresponding to the protruding part 5 of the molded article 3.

The base plate 35 is spaced apart from the core plate 15 by spacers 38 interposed therebetween. The base plate 35 is provided with a sleeve pin supporting part 36 which is coupled with the lower end portion of the sleeve pin 27 to support the sleeve pin 27, and an ejector rod through hole 37 through which passes an ejector rod 61.

The return pin 31 protrudes from the pin supporting plate 41 toward the core plate 15. A lower end portion of the return pin 31 is coupled with the pin supporting plate 41 to move together with the pin supporting plate 41, while an opposite end portion of the return pin 31 is movably received in the return pin accommodating hole 18 of the core plate 15. Between the pin supporting plate 41 and the core plate 15 is provided a return spring 33.

The return spring 33 disposed outside the return pin 31 biases the pin supporting plate 41 to return back to an original position when the pin supporting plate 41 is moved toward the core plate 15.

The ejector actuating part 40 moves the ejector pin 21 and the ejector sleeve 25 together to a separation position where the protruding part 5 of the molded article 3 is separated from the recessed part 13 of the core 11, and moves only the ejector pin 21 from the separation position to a removal position where the molded article 3 is spaced apart from the core 11 by a predetermine distance, while bringing the ejector sleeve 25 to a stop position such that the ejector sleeve 25 is not exposed outside the core 11. The ejector actuating part 40 has the first ejector plate 51, which supports the ejector pin 21 to move together with the ejector pin 21, the second ejector plate 55, which is disposed at a rear side of the first ejector plate 51 with respect to an ejection direction and which supports the ejector sleeve 25 to move together with the ejector sleeve 25, the ejector rod 61, which moves the first ejector plate 51 to eject the molded article 3 from the core 11, and a locking unit 70 which allows the ejector rod 61 to move the first ejector plate 51 and the second ejector plate 55 together to the separation position and to move only the first ejector plate 51 from the separation position to the removal position.

The first ejector plate 51 has a shape of a plate and is combined (or coupled) with the pin supporting plate 41 at an upper surface thereon by bolts to support the ejector pin 21. In the first ejector plate 51, a sleeve accommodating hole 52 is provided to movably receive the lower end portion of the ejector sleeve 27.

The pin supporting plate 41 has a shape of a plate and is combined (or coupled) with the first ejector plate 51 at a lower surface thereon by a bolt or screw. Although in the present embodiment the first ejector plate 51 and the pin supporting plate 41 are combined using bolts, it should be understood that other types of fasteners may be used and the present general inventive concept is not intended to be limited to using bolts. The pin supporting plate 41 is provided with an ejector pin supporting part 42 which supports the lower end portion of the ejector pin 21 so as to prevent the ejector pin 21 from escaping forward therefrom, and a sleeve pin supporting part 43 which supports the lower end portion of the ejector sleeve 25 so as to prevent the ejector sleeve 25 from escaping forward therefrom. In the pin supporting plate 41, a return pin supporting part 44 can be provided to support a lower end portion of the return pin 31 by accommodating it. In the pin supporting plate 41 and the first ejector plate 51, a stop bar through hole 53 is provided through which a stop bar 71 of the locking unit 70 described below movably passes.

The second ejector plate 55 has a shape of a plate and is disposed under a lower surface of the first ejector plate 51. The second ejector plate 55 is provided with a sleeve pin through hole 56 through which the sleeve pin 27 movably passes, and an ejector rod opening 57 through which the ejector rod 61 passes to contact the first ejector plate 51. Further, in the second ejector plate 55, a stop bar supporting part 58 to support the stop bar 71 of the locking unit 70 is provided. The second ejector plate 55 is brought in contact with a lower surface of the lower end portion of the ejector sleeve 25 by the sleeve spring 26, so that the second ejector plate 55 can move together with the ejector sleeve 25.

The ejector rod 61 presses the first ejector plate 51 upward to separate the molded (or injected) article 3 from the core 11. That is, if the ejector rod 61 presses the first ejector plate 51 upward, the ejector pin 21 is moved upward together with the first ejector plate 51 to press and eject the molded article 3. Since the first ejector plate 51 is combined with the second ejector plate 55 by the locking unit 70 to the separation position, the first ejector plate 51 is moved together with the second ejector plate 55, so that the ejector sleeve 25 is moved to press and eject the protruding part 5 of the molded article 3. Additionally, since the first ejector plate 51 is separated from the second ejector plate 55 by the locking unit 70 from the separation position to the removal position, the ejector sleeve 25 remains stationary and only the ejector pin 21 continues to move upward together with the first ejector plate 51 to eject the molded article 3 from the core 11 by a predetermined distance.

The locking unit 70 combines the first ejector plate 51 and the second ejector plate 55 so that the first ejector plate 51 and the second ejector plate 55 are moved together by the ejector rod 61 to the separation position. Additionally, the locking unit 70 separates the second ejector plate 55 from the first ejector plate 51 so that the first ejector plate 51 is moved by the ejector rod 61 from the separation position to the removal position. The locking unit 70 has the stop bar 71 which stops a movement of the second ejector plate 55 at the separation position, and a spring member 75 combined with the stop bar 71 to bias the first ejector plate 51 toward the second ejector plate 55.

The stop bar 71 has a shape of a longitudinal rod so that the stop bar 71 passes through the first ejector plate 51 vertically and moves together with the second ejector plate 55. Moreover, the stop bar 71 stops the movement of the second ejector plate 55 at the separation position. A lower end portion of the stop bar 71 is connected to the second ejector plate 55 by bolts or the like, so that the stop bar 71 moves together with the second ejector plate 55. An opposite upper end portion of the stop bar 71 extends through the stop bar through hole 53 of the first ejector plate 51 and the pin supporting plate 41, and the stop bar 71 is long enough to stop the movement of the second ejector plate 55 at the separation position. The stop bar 71 can be brought to a stop position when the stop bar 71 contacts the core plate 15 at the separation position. However, the stop bar 71 may be brought to a stop by a separately prepared stop device for the stop bar 71 at a different separation position. The stop bar 71 is provided with a spring mount plate 77 which supports the spring member 75 so that the spring member 75 biases the first ejector plate 51.

The spring member 75 may be a coil spring disposed outside the stop bar 71 to bias the first ejector plate 51 toward the second ejector plate 55. Therefore, the first ejector plate 51 moves together with the second ejector plate 55 due to the elastic force of the spring member 75 to the separation position.

The operation of the molding apparatus according to the present embodiment will now be described.

First, after an injection or molding operation has been completed the movable mold 10 is separated from the fixed mold and the molded article 3 is still attached to the core 11 of the movable mold 10 as illustrated in FIG. 1.

Figure 2:
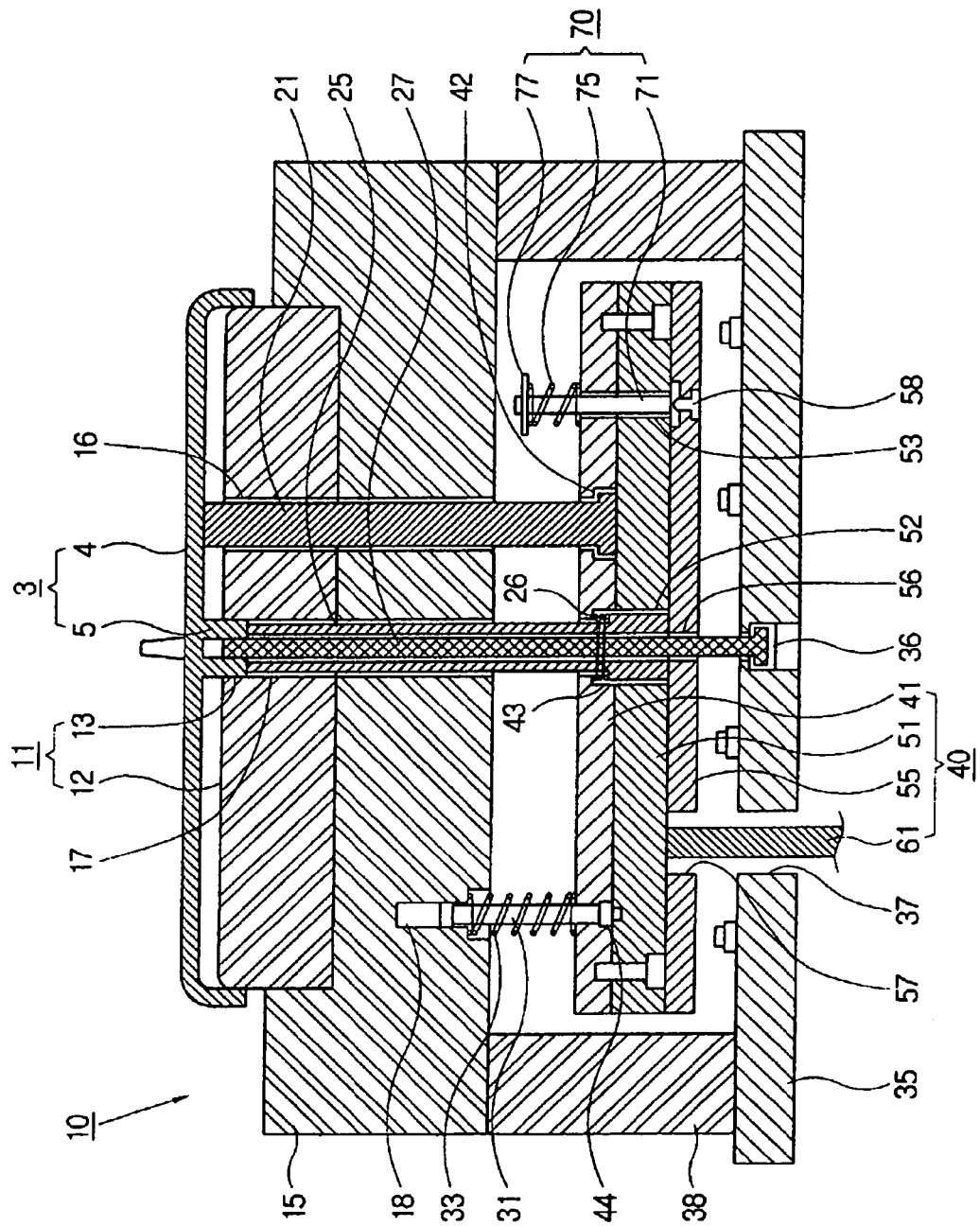
FIGS. 2 to 4 are cross sectional views illustrating an operation of the molding apparatus of FIG. 1.
Figure 3:
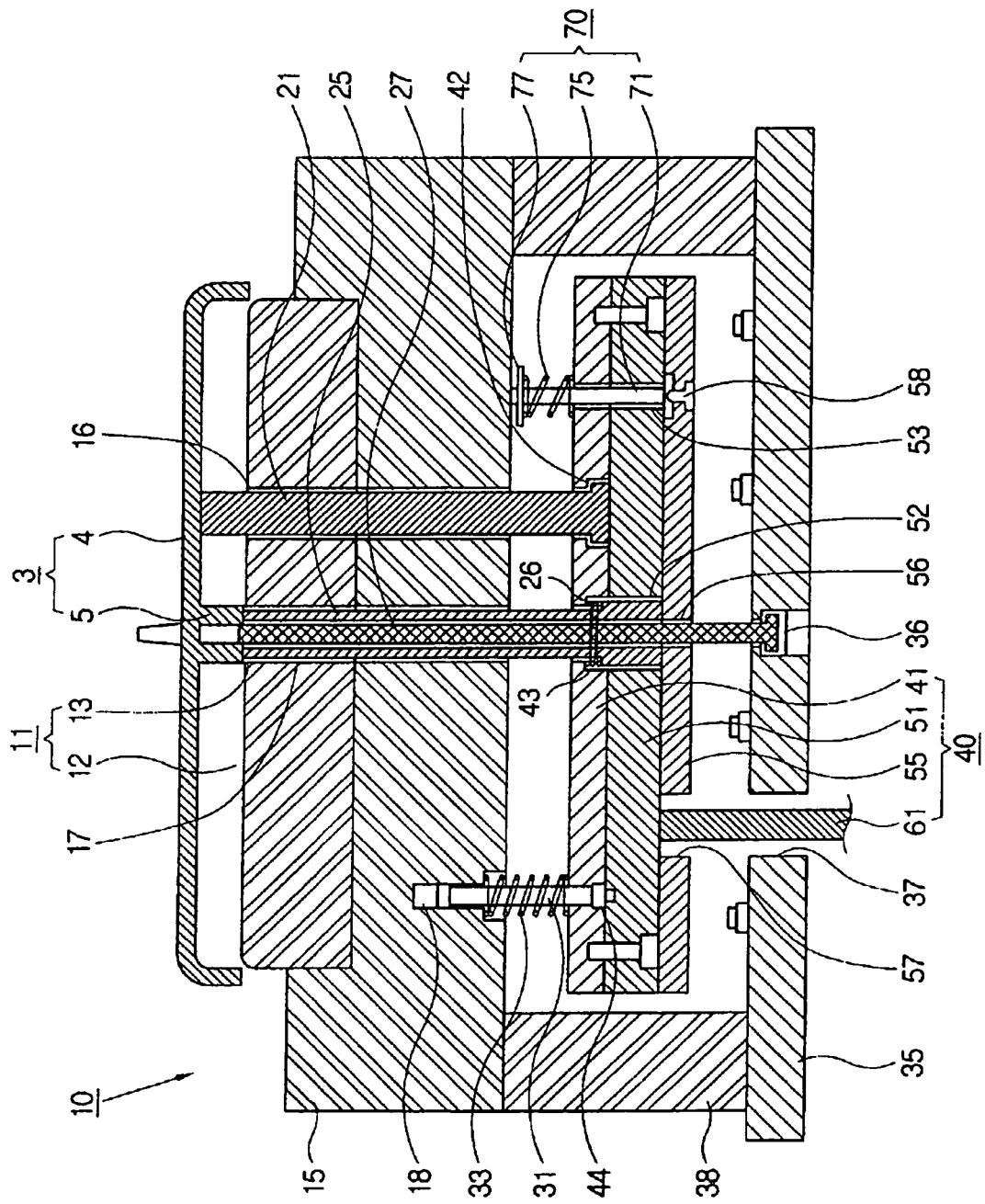
Figure 4:
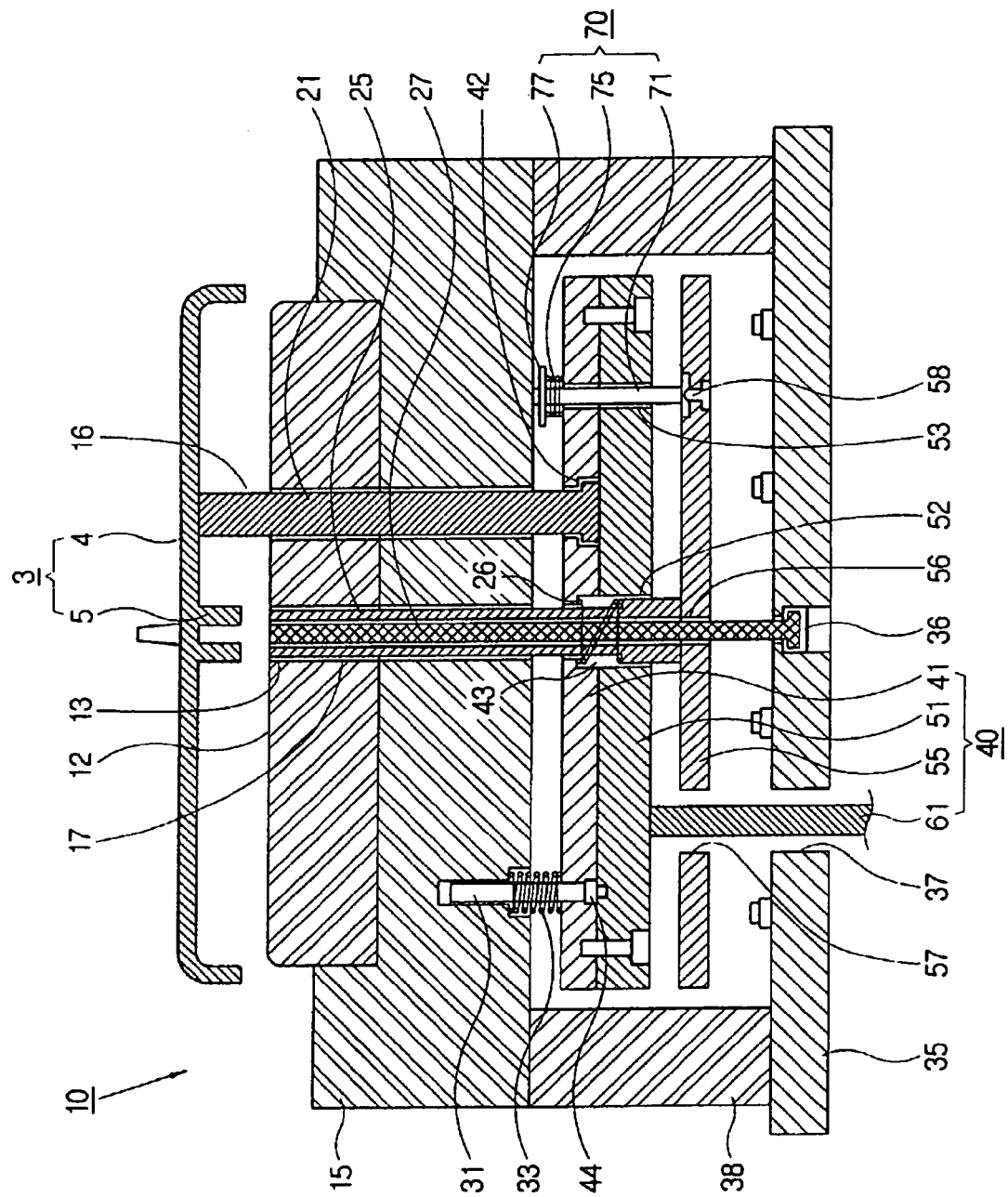

Next, the ejector rod 61 is moved upward to eject the molded article 3 from the core 11 (see FIG. 2). Then, the ejector rod 61 pushes the first ejector plate 51 so that the ejector pin 21 and the ejector sleeve 25 move upward together pushing the molded article 3. At this time, since the first ejector plate 51 and the second ejector plate 55 move together due to the elastic force of the spring member 75 of the locking unit 70 to the separation position where the protruding part 5 of the molded article 3 is just separated from the recessed part 13 of the core 11, the ejector pin 21 and ejector sleeve 25 move upward together due to the ejector rod 61 (see FIG. 3). Then, the ejector rod 61 continues to push the first ejector plate 51 from the separation position to the removal position, so that the ejector pin 21 continues to move upward together with the first ejector plate 51 (see FIG. 4). At this time, since the stop bar 71 of the locking unit 70 contacts the core plate 15 to be brought to the stop position, the second ejector plate 55 is also brought into the stop position, and the ejector sleeve 25 is biased toward the second ejector plate 55 by the sleeve spring 26 to be also brought to the stop position together with the second ejector plate 55 (see FIG. 4).

When the ejector rod 61 moves downwards, the pin supporting plate 41 and the first ejector plate 51 are moved downwards together with the ejector pin 21 by the return spring 33. Then, the second ejector plate 55 and the ejector sleeve 25 are pushed downwards by the pin supporting plate 41 and the first ejector plate 51 to return back to original positions illustrated in FIG. 1.

As described above, in the molding apparatus of the present embodiment, the ejector sleeve 25 ejects the protruding part 5 of the molded article 3 from the recessed part 13 of the core 11 without being exposed outside the core 11. Therefore, it is possible to prevent its damage, such as a bending, which may occur when continuing to press the molded article 3 after the ejector sleeve 25 is exposed outside the core 11. And it is possible to prevent damage, which are done to the molded articles by the bending of the ejector sleeve. It is also possible to prevent the bent ejector sleeve from causing damage on the shape surface 12 of the core 11 when the bent ejector sleeve returns thereto.

FIGS. 5 to 8 are schematic cross sectional views illustrating a molding apparatus including a movable unit 110 according to another embodiment of the present general inventive concept. As illustrated in FIGS. 5 to 8, a locking unit 170 in the present embodiment of the molding apparatus is different from the locking unit 70 of FIGS. 1-4.

The locking unit 170 has a stop bar 171 which stops a movement of the second ejector plate 55, a locking protrusion 175 sticking out from either one of the first ejector plate 51 and the second ejector plate 55 to the other thereof, and a protrusion accommodating part 177 provided in the other one of the first ejector plate 51 and second ejector plate 55 to be combined with the locking protrusion 175.

The stop bar 171 has a shape of a longitudinal bar which can be vertically passing through the first ejector plate 51 to stop the movement of the second ejector plate 55 at the separation position. The stop bar 171, for example, extends from the core plate 15 to the first ejector plate 51 and can be movably inserted into the stop bar through hole 53 of the first ejector plate 51. However, the stop bar 171 may extend from the second ejector plate 55 to the core plate 15. The stop bar 171 is long enough to stop the movement of the second ejector plate 55 at the separation position.

The locking protrusion 175, for example, extends from the first ejector plate 51 to the second ejector plate 55. However, the locking protrusion 175 may extend from the second ejector plate 55 to the first ejector plate 51.

The protrusion accommodating part 177 is, for example, formed as a recess in the second ejector plate 55 to accommodate and be combined with the locking protrusion 175. The protrusion accommodating part 177 is combined with the locking protrusion 175 to produce a predetermined combining force therebetween. The predetermined combining force may be strong enough for the second ejector plate 55 to move together with the first ejector plate 51 when the ejector rod 61 pushes the first ejector plate 51. Moreover, the predetermine combining force may be strong enough for the locking protrusion 175 to be readily separated from the protrusion accommodating part 177 by the stop bar 171 at the separation position after the second ejector plate 55 has moved together with the first ejector plate 51.

The operation of the molding apparatus of the present embodiment will now be described.

First, after an injection or molding operation has been completed, the movable mold 110 is separated from the fixed mold. However, the molded article 3 is still attached to the core 11 of the movable mold 110 as illustrated in FIG. 5.

Next, the ejector rod 61 is moved upward to eject the molded article 3 from the core 11 (see FIG. 6) to push the first ejector plate 51, so that the ejector pin 21 and the ejector sleeve 25 move upward together pushing the molded article 3. At this time, since the first ejector plate 51 and the second ejector plate 55 move together due to a combining force between the locking protrusion 175 of the protrusion accommodating part 177 of the locking unit 170 to the separation position where the protruding part 5 of the molded article 3 is just separated from the recessed part 13 of the core 11, the ejector pin 21 and ejector sleeve 25 move upward together due to the ejector rod 61 (see FIG. 7). Then, the ejector rod 61 continues to push the first ejector plate 51 from the separation position to the removal position, so that the ejector pin 21 continues to move upward together with the first ejector plate 51 (see FIG. 8). At this time, since the stop bar 171 of the locking unit 170 contacts the second ejector plate 55 bringing the ejector plate 55 to a stop position, the ejector sleeve 25 is biased toward the second ejector plate 55 by the sleeve spring 26 to be also brought into the stop position together with the second ejector plate 55 (see FIG. 8).

When the ejector rod 61 moves downwards, the pin supporting plate 41 and the first ejector plate 51 are moved downwards together with the ejector pin 21 by the return spring 33. Then, the second ejector plate 55 and the ejector sleeve 25 are pushed downwards by the pin supporting plate 41 and the first ejector plate 51 to return back to their original positions illustrated in FIG. 5.

Figure 5:
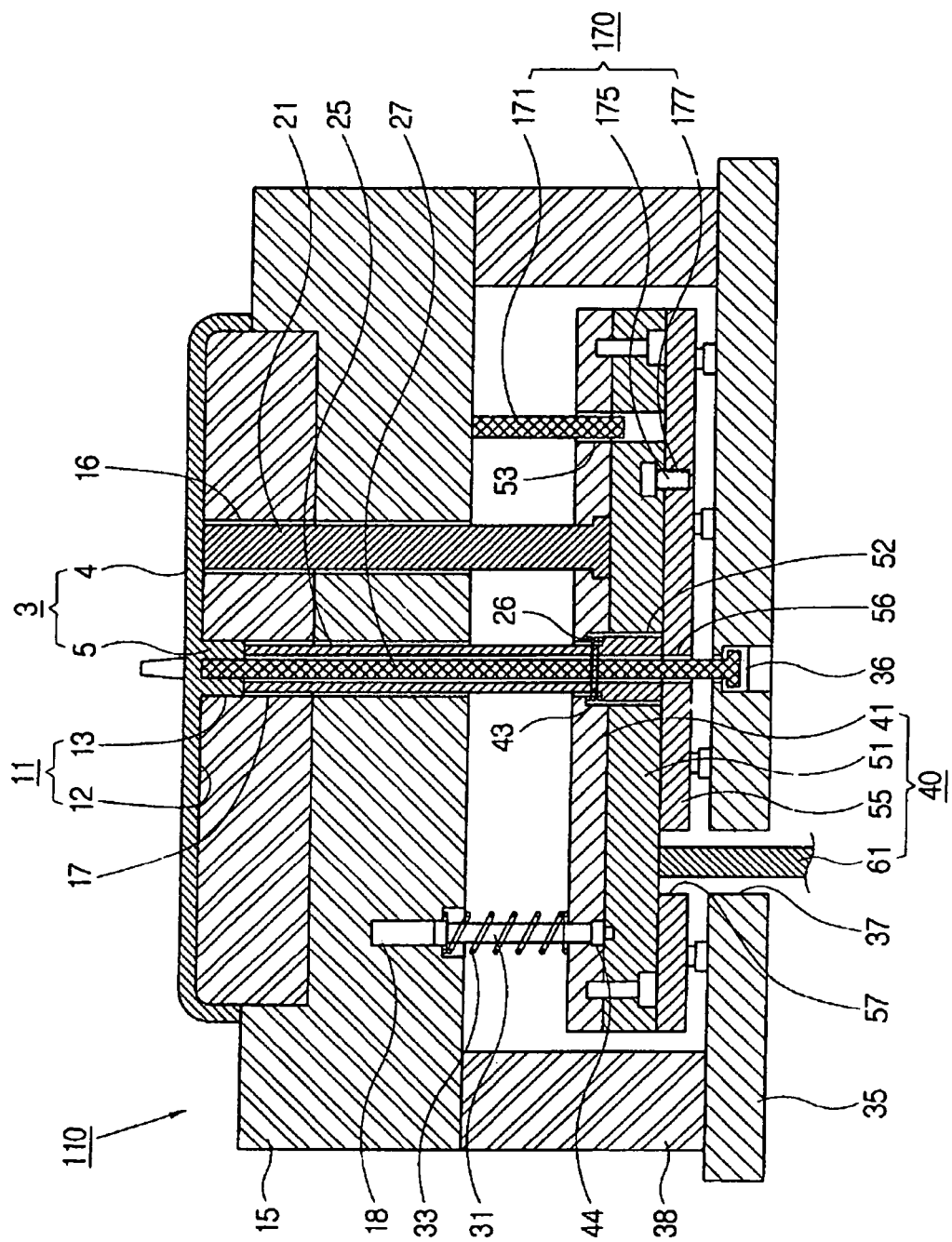
FIG. 5 is a schematic cross sectional view illustrating a molding apparatus according to another embodiment of the present general inventive concept.
Figure 6:
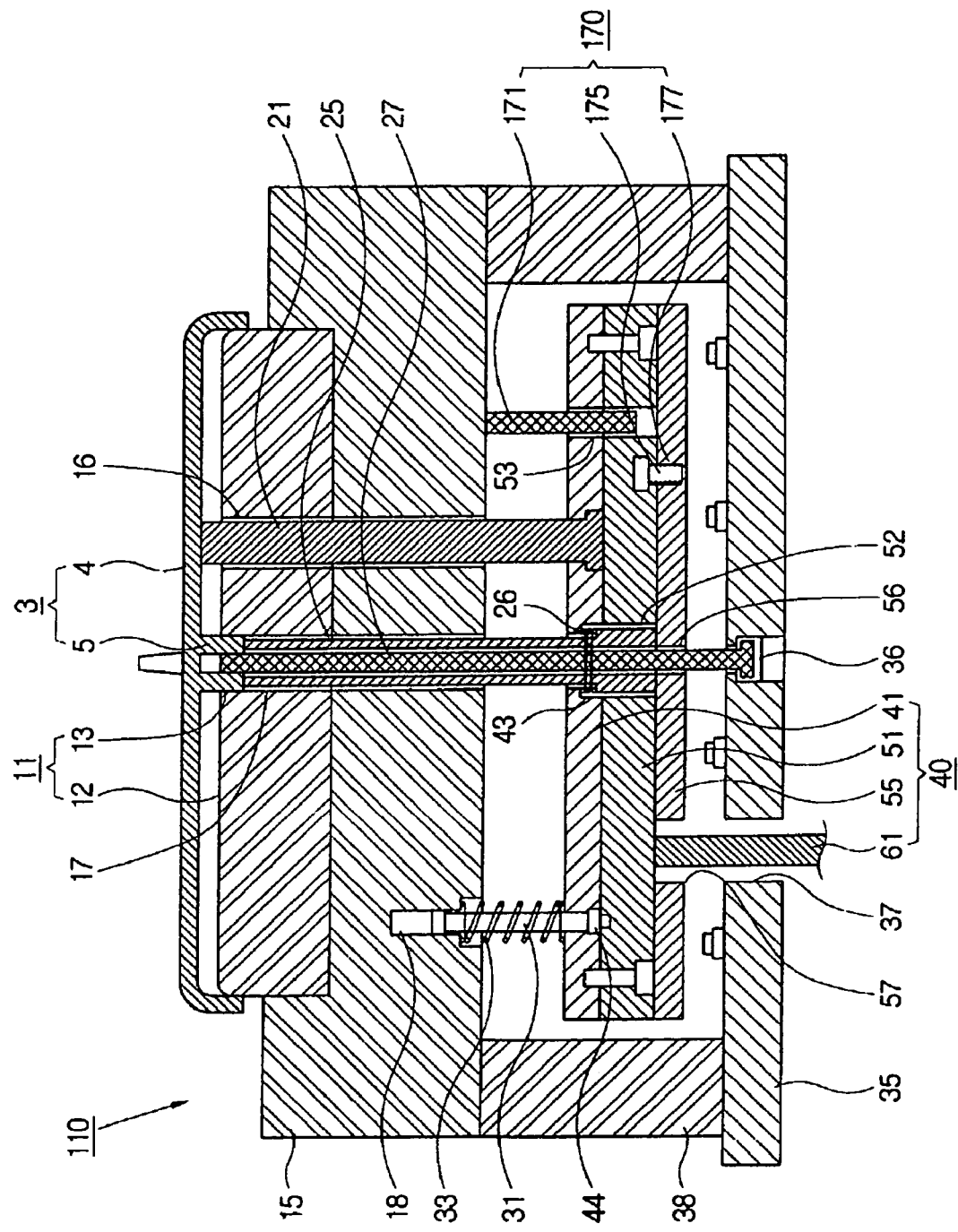
FIGS. 6 to 8 are cross sectional views illustrating an operation of the molding apparatus of FIG. 5.
Figure 7:
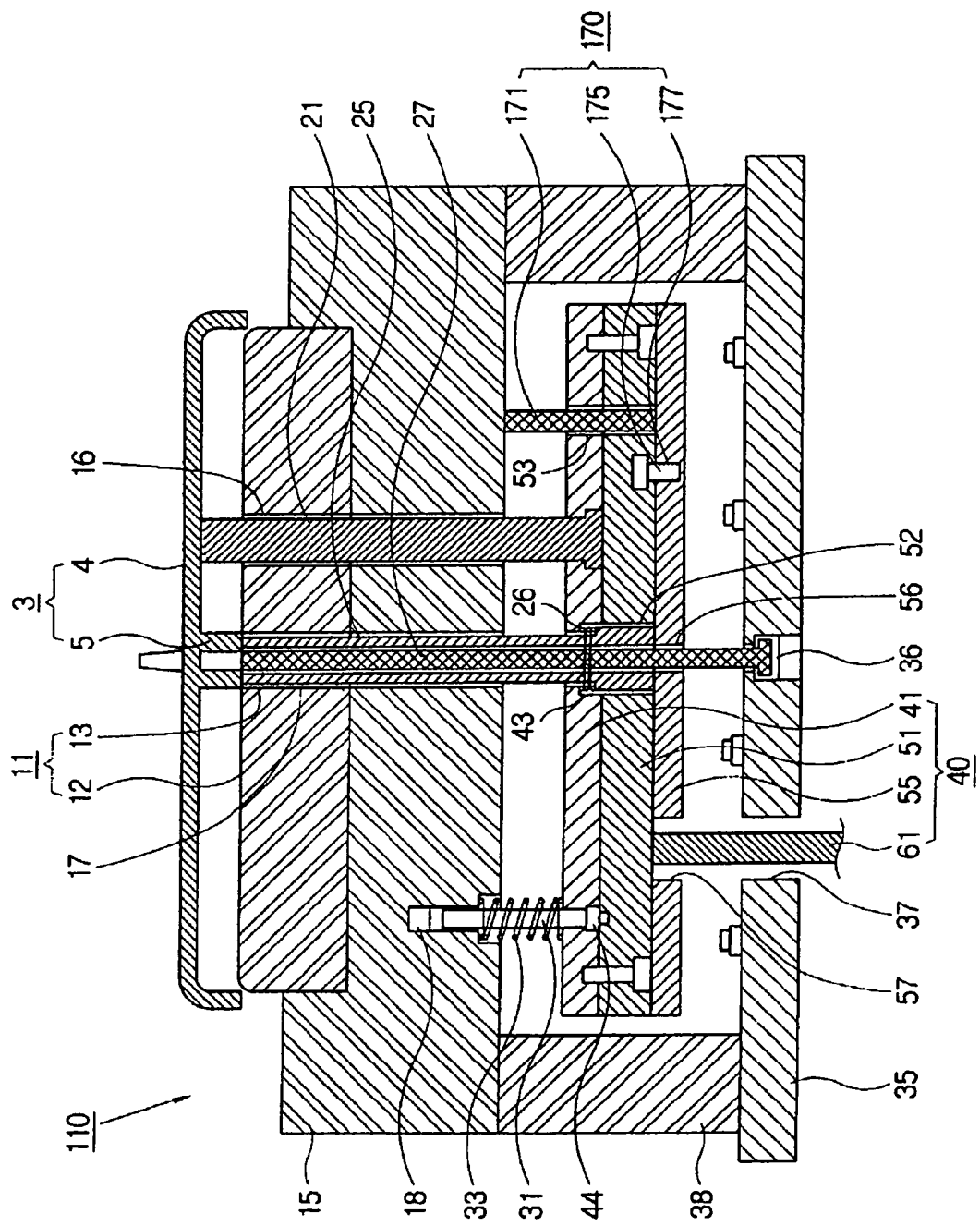
Figure 8:
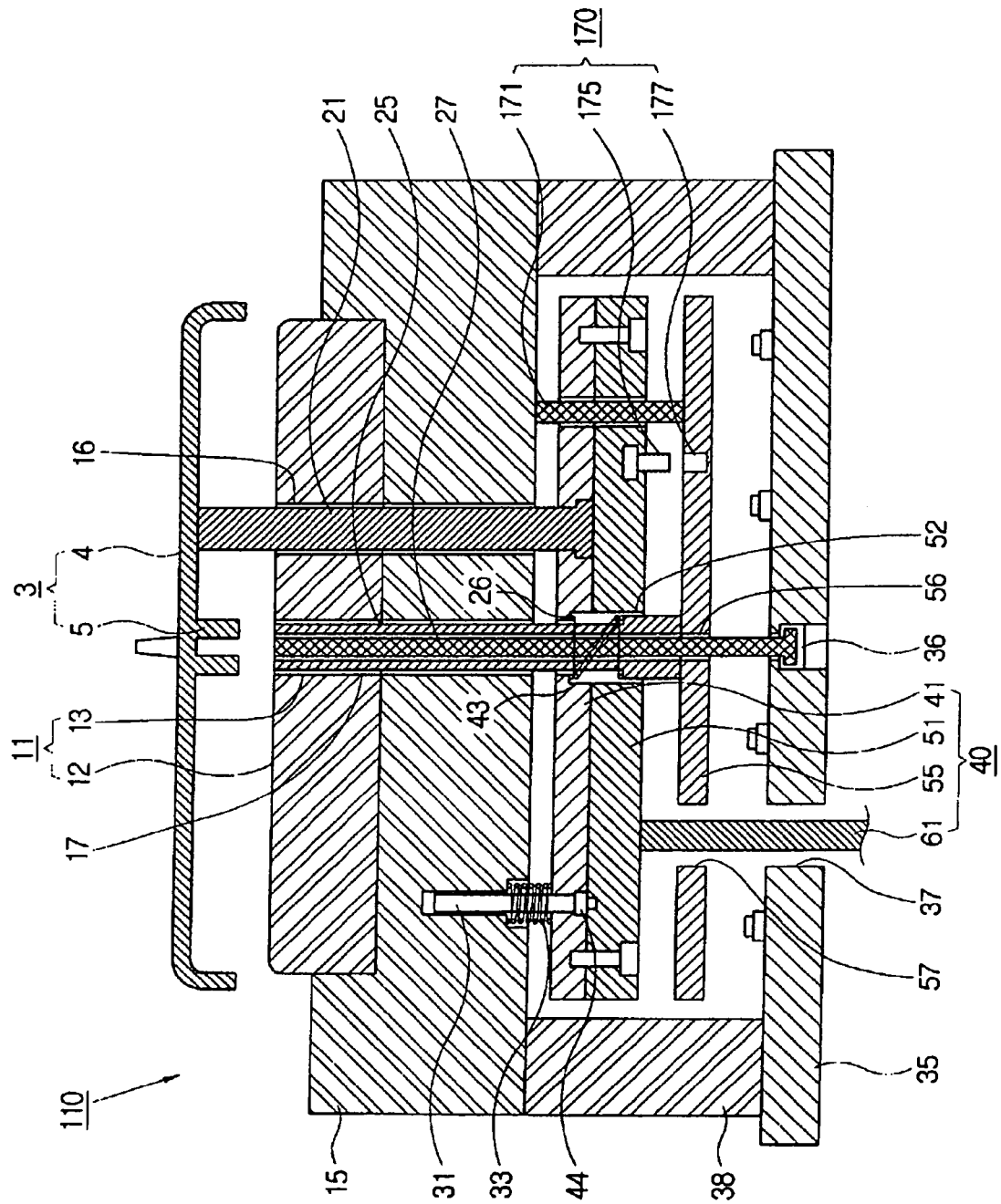

Then, the second ejector plate 55 and the ejector sleeve 25 move downwards to return back to their original positions illustrated in FIG. 5.

Accordingly, in the present embodiment of the molding apparatus, it is possible to prevent more easily the ejector sleeve's exposure to the outside of the core by providing the stop bar, the locking protrusion and the protrusion accommodating part.

As described above, according to various embodiments of the present general inventive concept, since the ejector sleeve is not exposed outside the core, it is possible to prevent the ejector sleeve's damage such as bending.

Further, it is possible to prevent damage, which is done to the molded articles by the bending of the ejector sleeve, and it is also possible to prevent the bent ejector sleeve from causing damage to the shape surface of the core when it returns thereto.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A molding apparatus, comprising:
   a core having a recessed part corresponding to a protruding part of a molded article;
   an ejector pin movably provided in the core to eject the molded article;
   an ejector sleeve movably provided in the core to push the protruding part of the molded article; and
   an ejector actuating part to move the ejector pin and the ejector sleeve together to a separation position where the protruding part of the molded article is separated from the recessed part of the core, to bring the ejector sleeve to a stop position so that the ejector sleeve does not protrude from the core, and to move the ejector pin from the separation position to a removal position where the molded article is spaced apart from the core by a predetermined distance.

2. The apparatus according to claim 1, wherein the ejector actuating part comprises:
   a first ejector plate to support the ejector pin to move together with the ejector pin;

a second ejector plate which is disposed at a rear side of the first ejector plate with respect to an ejection direction to support the ejector sleeve to move together with the ejector sleeve;

an ejector rod to move the first ejector plate to eject the molded article from the core; and a locking unit to combine the first ejector plate and the second ejector plate to allow the ejector rod to move the first ejector plate and the second ejector plate together to the separation position and to separate the first ejector plate from the second ejector plate to allow the ejector rod to move only the first ejector plate from the separation position to the removal position.

3. The apparatus according to claim 2, wherein the locking unit comprises:

a stop bar which passes through the first ejector plate vertically to move together with the second ejector plate and to stop the movement of the second ejector plate at the separation position; and a spring member that is combined with the stop bar to bias the first ejector plate toward the second ejector plate.

4. The apparatus according to claim 3, wherein the stop bar comprises a spring mount plate to support the spring member so that the spring member biases the first ejector plate toward the second ejector plate.

5. The apparatus according to one of claims 3, further comprising:

a core plate to support the core, wherein the stop bar is brought to the stop position when the stop bar contacts the core plate at the separation position.

6. The apparatus according to claim 2, wherein the locking unit comprises:

a stop bar which passes through the first ejector plate vertically to stop a movement of the second ejector plate at the separation position;

a locking protrusion that protrudes from either one of the first ejector plate and the second ejector plate to the other thereof; and a protrusion accommodating part provided in the other one of the first ejector plate and the second ejector plate to be combined with the locking protrusion so that the first ejector plate moves together with the second ejector plate to the separation position.

7. The apparatus according to claim 6, further comprising:
a core plate to support the core,
wherein the stop bar protrudes from the core plate to the first ejector plate.

8. The apparatus according to claim 2, wherein the second ejector plate comprises an ejector rod through hole through which the ejector rod passes.

9. The apparatus according to claim 2, wherein one end portion of the ejector sleeve is disposed between the first ejector plate and the second ejector plate, and is provided with a sleeve spring to bias the ejector sleeve towards the second ejector plate.

10. A molding apparatus, comprising:
a core having a first core part and a second core part;
a first ejector to correspond to the first core part;
a second ejector to correspond to the second core part; and
an ejector actuating part to move the first ejector and the second ejector between an original position and a separation position at which the first ejector does not protrude from the core, and to move the second ejector between the separation position and a removal position at which a molded article is removed from the molding apparatus during controlling the first ejector to be remained in the separation position, wherein:

the core comprises a first hole and a second hole through which the first ejector and the second ejector pass, respectively, in an ejection direction;

the first ejector comprises an end disposed adjacent to the first core part and another end connected to the ejector actuating part; and the second ejector comprises an end disposed adjacent to the second core part and another end connected to the ejector actuating part.

11. The apparatus according to claim 10, wherein the ejector actuating part comprises:

a first ejector plate to contact the another end of the second ejector to move the second ejector; and a second ejector plate to contact the another end of the first ejector to move the first ejector and to control the first ejector to be in the separation position when the first ejector plate moves the second ejector from the separation position to the removal position.

12. The apparatus according to claim 10, further comprising:

a first ejector plate to be coupled to the first ejector and the second ejector; and a second ejector plate to be coupled to the first ejector, wherein the ejector actuating part controls the first ejector and the second ejector to selectively move with each other.

13. The apparatus according to claim 12, wherein the ejector actuating part comprises an ejector rod to move the first ejector plate, and a locking unit to selectively separate the second ejector plate from the first ejector plate.

14. The apparatus according to claim 13, wherein the locking unit comprises a pin mounted on the core to separate the second ejector plate from the first ejector plate such that the second ejector moves from the separation position to the removal position while the first ejector remains in the separation position.

15. The apparatus according to aim 13, wherein the locking unit comprises a pin mounted on the second ejector plate to separate the second ejector plate from the first ejector when the first ejector plate and the second plate are In the separation position.

* * * * *

UNITED STATES PATENT AND TRADEMARK OFFICE
CERTIFICATE OF CORRECTION

PATENT NO. : 7,597,550 B2 Page 1 of 1
APPLICATION NO. : 11/475182
DATED : October 6, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 417 days.

Signed and Sealed this

Twenty-eighth Day of September, 2010

David J. Kappos
*Director of the United States Patent and Trademark Office*